United States Patent Office 3,284,185
Patented Nov. 8, 1966

3,284,185
METHOD OF DEFOLIATING PLANTS
Harmannus Koopman and Jasper Daams, both of Van Houtenlaan, Weesp, Netherlands
No Drawing. Filed Dec. 27, 1965, Ser. No. 516,694
Claims priority, application Netherlands, Sept. 14, 1962, 283,262
3 Claims. (Cl. 71—2.5)

The invention in this application relates to a new and improved method of defoliating living plants, particularly cotton plants.

This application is a continuation-in-part of our copending application Serial Number 308,363, filed September 12, 1963.

In our copending application we showed that the compound ethyl-amino-pentachloro-phosphonitrile, hereinafter called H 437, was an effective herbicide for undesirable weeds. Now we have unexpectedly found that the compound H 437 does not act as a herbicide for a selected group of plants but instead exhibits defoliating action on these plants without having any harmful effect on the plants themselves. We have found H 437 to be particularly useful as a defoliant for cotton plants and rose plants.

Chemical defoliation of cotton plants is important in order to prevent staining of the cotton with leaves, particularly when mechanical pickers are employed, to prevent boll rot by removing the leaves which tend to shade the mature bolls and to reduce the population of harmful insects.

We have found that the compound H 437 is a very effective cotton defoliant when applied on normal cotton plants at rates varying from about 10 to 50 kilograms per hectare. Depending upon environmental factors as well as the density of the plant growth this concentration may be either decreased or increased.

Our defoliant may be applied in dust or liquid form.

If applied in liquid form, aqueous dispersions are prepared by mixing wettable powders or miscible oils with water. Miscible oils may be prepared by dissolving or dispersing the H 437 in an inert solvent such as toluene, xylene, aliphatic, alicyclic or aromatic ketones, for example acetone, methylethylketone or cyclohexanone, or mixtures thereof with hydrocarbons, if desired, with the addition of surface-active substances and dispersion agents. Examples of surface active agents that may be employed are the alkali metal salts of long chain alkyl sulfates, polyethylene glycol ethers of alkyl phenols and other similar materials known in the agricultural art.

A dust may be produced by mixing the H 437 with a pulverized inert carrier such as chalk, dolomite, kaolin or pipe clay.

In any event, whether applied in liquid or solid form, we have found that the concentration of the H 437 may range from about 0.5 to 5% by weight of the carrier. However, we have found that the concentration of 0.5 to 2% is the most practical to use.

The H 437 defoliant of our invention is usually applied to cotton when the bolls are from 30 to 40 days old but this may vary according to the season, climate and other environmental conditions.

Our invention will now be explained more fully with reference to the following examples and table.

Example 1

A dust was produced by mixing 5 parts by weight of H 437 with 95 parts by weight of kieselguhr and grinding the mixture.

Example 2

A wettable powder was produced by intimately mixing 20 parts by weight of H 437, 5 parts by weight of oleylamidomethyl laurate, 10 parts by weight of calcium lignine sulfanate and 15 parts of chalk and grinding the resultant mixture.

Example 3

A sprayable dispersion was produced by pouring into 1000 parts of water a miscible oil prepared by mixing 25 parts by weight of H 437, 10 parts by weight of polyoxyethylene sorbitan fatty acid ester, 25 parts by weight of acetone and 30 parts by weight of methyl ethyl ketone.

In order to compare the defoliating properties of H 437 with compounds which are known to have leaf burning properties, the following experiments were carried out.

Cotton plants several months old were sprayed with solutions containing 1% of one of H 437 or Wiedasol TL (active constituents 3-amino-triazole-1,2,4 and ammonium thiocyanate) or Paraquat (active constituent 1,1'-dimethyl-4,4'-bipyridinium chloride). The defoliant activity and leaf burning activity was measured the second week and the third week after application and the results compared in the following table.

In the table, defoliating activity is expressed by 0–4, 0 representing no activity and 4 representing complete defoliation. Leaf burning activity is expressed by 0–10, 0 meaning no leaf burning and 10 meaning complete leaf burning.

| Active Agent | Concentration, kg./ha. | Week 2 | | Week 3 | |
|---|---|---|---|---|---|
| | | Leaf b. | Defol. | Leaf b. | Defol. |
| Untreated | | 0 | 0 | 0 | 0 |
| Wiedasol | 15 | 5 | ½ | 5 | 1 |
| Paraquat | 10 | 10 | 0 | 10 | 0 |
| H 437 | 10 | 4 | 1 | 5 | 2 |
| H 437 | 20 | 7 | 3 | 9.5 | 4 |

No damage to the stem or other parts of the plant was observed with the use of H 437.

While we have described our invention in connection with specific embodiments and applications, other modifications thereof will be readily apparent to those skilled in this are without departing from the spirit and scope of the invention as defined in the appended claims.

What we claim is:

1. A method of defoliating plants having an annual leaf drop comprising the step of applying to said plants in an amount sufficient to cause defoliation, ethyl-amino-pentachloro-phosphonitrile.

2. The method of claim 1 wherein the plant is a cotton plant.

3. The method of claim 2 wherein about 10 to 50 kilograms per hectare of the ethyl-aminopentachloro-phosphonitrile is employed.

References Cited by the Examiner
UNITED STATES PATENTS
3,197,464   11/1965   Ottman et al. _____ 260—239
FOREIGN PATENTS
894,152   4/1962   Great Britain.
OTHER REFERENCES
Audrieth et al., Chemical Reviews, Vol. 32, pages 118 to 120 and 126 to 130 (1943).

LEWIS GOTTS, Primary Examiner.
JAMES O. THOMAS, JR., Assistant Examiner.